Patented Apr. 29, 1952

2,594,860

UNITED STATES PATENT OFFICE 2,594,860

PREPARATION OF PHENYLTRICHLORO-SILANE

Stuart D. Brewer, Burnt Hills, N. Y., assignor to General Electric Company, a corporation of New York No Drawing. Application May 2, 1951, Serial No. 224,255

2 Claims. (Cl. 260—448.2)

This invention is concerned with a method for preparing phenyltrichlorosilane. More particularly, the invention is concerned with a process for making phenyltrichlorosilane which comprises effecting reaction between a mixture of ingredients comprising benzene, dichlorosilane and silicon tetrachloride in the presence of a boron halide as a catalyst.

It is known that phenyltrichlorosilane may be prepared by effecting reaction between benzene and silicochloroform or trichlorosilane. I have now found that I can dispense with the use of trichlorosilane and instead prepare phenyltrichlorosilane by reacting the benzene with a mixture of ingredients comprising dichlorosilane and silicon tetrachloride in the presence of a boron halide, specifically, boron trichloride or boron trifluoride or its etherate as a catalyst for the reaction. The reaction is preferably conducted in a pressure reactor under autogenous pressure (e. g., from 750 p. s. i. to 2500 p. s. i. or more) at temperatures ranging from about 250° C. to below the decomposition point of either the reactants or the reaction product. Temperatures of the order of 300–450° C. are advantageously employed. At these elevated temperatures, the autogenous pressure developed by heating the contents of the pressure reactor is sufficient to cause the reaction to go substantially to the equilibrium state.

The amount of reactants employed may be varied within wide limits but generally on a molar ratio basis, for each mol of benzene, I may use 0.5 mol of the silicon tetrachloride and 0.5 mol of the dichlorosilane ($H_2SiCl_2$). It will, of course, be apparent to those skilled in the art that the molar concentrations may be varied so that for each mol of benzene employed there may be used from 0.1 to 1 or more mols of each of the other two ingredients; namely, of the dichlorosilane and silicon tetrachloride.

The fact that it was possible to obtain phenyltrichlorosilane by effecting reaction between the benzene and the dichlorosilane and the silicon tetrachloride was unexpected and in no way could have been predicted, since phenyltrichlorosilane can not be obtained satisfactorily from reacting benzene and silicon tetrachloride, and what one might expect from the reaction between benzene and dichlorosilane is diphenyldichlorosilane. The presence of the dichlorosilane is therefore essential in the practice of the present invention to obtain phenyltrichlorosilane. By means of my claimed method for making phenyltrichlorosilane a large proportion of the reaction product exclusive of the unreacted materials comprises phenyltrichlorosilane.

In order that those skilled in the art may better understand how the present invention may be practiced, the following example is given by way of illustration and not by way of limitation. All parts are by weight. The mols recited one in a molar ratio.

Example 1

A pressure vessel was filled with 25.5 parts (0.255 mol) dichlorosilane, 36.6 parts (0.215 mol) silicon tetrachloride, and 27.4 parts (0.351 mol) benzene. To this pressure vessel was then added a small amount of boron trichloride equal to approximately 0.8 part. The pressure vessel was then heated at 400° C. for 4 hours at about 1500 p. s. i. At the end of this time the reaction vessel was opened and the liquid product therein was fractionally distilled to obtain an organosilicon composition of which approximately 80 per cent thereof was phenyltrichlorosilane. Analysis of this fraction showed conclusively that it comprised mostly phenyltrichlorosilane.

It will, of course, be apparent to those skilled in the art that other amounts of boron trichloride or other boron halides, for example, boron trifluoride, boron trifluoride etherate,, or even aluminum or zinc chloride may also be used and that the amount of catalyst may be varied, for example, from about 0.05 to 3 or more per cent, by weight, based on the total weight of the reactants.

The phenyltrichlorosilane prepared in accordance with my method may be hydrolyzed either by itself or in combination with other organohalogenosilanes to make various silicone resins, rubbers, and oils.

What I claim as new and desire to secure by Letters Patent of the United States is:

1. The process for making phenyltrichlorosilane which comprises effecting reaction in the presence of a boron halide catalyst of a reactive mixture of ingredients consisting essentially of silicon tetrachloride, dichlorosilane, and benzene.

2. The process for making phenyltrichlorosilane which comprises effecting reaction in the presence of boron trichloride at a temperature of from 250–450° C. under autogenous pressure of a reactive mixture of ingredients consisting essentially of silicon tetrachloride, dichlorosilane and benzene.

STUART D. BREWER.

REFERENCES CITED

The following references are of record in the file of this patent:

UNITED STATES PATENTS

| Number | Name | Date |
|---|---|---|
| 2,576,448 | Daudt | Nov. 27, 1951 |